(12) United States Patent
Arslan et al.

(10) Patent No.: US 12,091,490 B2
(45) Date of Patent: Sep. 17, 2024

(54) ACRYLATE END-CAPPED URETHANE- OR UREA-BASED POLYMERS

(71) Applicants: Universiteit Gent, Ghent (BE); Allnex Belgium SA, Drogenbos (BE)

(72) Inventors: Aysu Arslan, Ghent (BE); Hugues van den Bergen, Drogenbos (BE); Patrice Roose, Sint-Pieters-Leeuw (BE); Dirk Bontinck, Ertvelde (BE); Sandra van Vlierberghe, Sint-Niklaas (BE); Peter Dubruel, Ghent (BE)

(73) Assignees: Universiteit Gent, Ghent (BE); Allnex Belgium SA, Drogenbos (BE)

( * ) Notice: Subject to any disclaimer, the term of this patent is extended or adjusted under 35 U.S.C. 154(b) by 576 days.

(21) Appl. No.: 17/291,049

(22) PCT Filed: Nov. 5, 2019

(86) PCT No.: PCT/EP2019/080197
§ 371 (c)(1),
(2) Date: May 4, 2021

(87) PCT Pub. No.: WO2020/094621
PCT Pub. Date: May 14, 2020

(65) Prior Publication Data
US 2021/0388151 A1 Dec. 16, 2021

(30) Foreign Application Priority Data

Nov. 5, 2018 (EP) .................................. 18204369
Jun. 7, 2019 (EP) .................................. 19178917

(51) Int. Cl.
| | | |
|---|---|---|
| C08G 18/67 | (2006.01) | |
| C08G 18/42 | (2006.01) | |
| C08G 18/48 | (2006.01) | |
| C08G 18/75 | (2006.01) | |
| C08L 75/16 | (2006.01) | |
| C09D 175/16 | (2006.01) | |

(52) U.S. Cl.
CPC ....... *C08G 18/673* (2013.01); *C08G 18/4244* (2013.01); *C08G 18/4825* (2013.01); *C08G 18/755* (2013.01); *C08L 75/16* (2013.01); *C09D 175/16* (2013.01)

(58) Field of Classification Search
CPC ...... C09D 175/16; C08G 18/673; C08L 75/16
See application file for complete search history.

(56) References Cited

U.S. PATENT DOCUMENTS

| | | | | | |
|---|---|---|---|---|---|
| 5,178,952 A | * | 1/1993 | Yamamoto | ........... | C08G 18/673 525/450 |
| 5,719,227 A | * | 2/1998 | Rosenberry | ........ | C08G 18/7837 522/12 |
| 5,741,872 A | * | 4/1998 | Smith | ..................... | C08L 75/14 526/301 |
| 2004/0010053 A1 | * | 1/2004 | Wang | ................. | C08G 18/6715 560/115 |
| 2004/0091632 A1 | * | 5/2004 | Matsunami | .......... | C09D 175/16 427/508 |
| 2006/0089453 A1 | * | 4/2006 | Pajerski | ................. | C08G 18/12 524/589 |
| 2008/0257216 A1 | | 10/2008 | Ravyst | | |
| 2011/0262755 A1 | * | 10/2011 | Panther | .............. | C08G 18/2815 428/423.1 |

FOREIGN PATENT DOCUMENTS

CN 106167678 A 11/2016
WO 2018143912 A1 8/2018

OTHER PUBLICATIONS

International Search Report and Written Opinion mailed Jan. 30, 2020, in reference to co-pending European Patent Application No. PCT/EP2019/080197 filed Nov. 5, 2019.
European Search Report in reference to co-pending European Application No. EP18204369 filed Apr. 18, 2019.
Berg, et al., "Synthesis of Photopolymerizable Hydropholic Macromers and Evaluation of Their Applicability as Reactive Resin Components for the Fabrication of Three-Dimensionally Structured Hydrogel Matrices by 2-Photon-Polymerization", Advanced Biomaterials, vol. 13, No. 9, pp. B274-B284, 2011.
Claeyssens, et al., "Three-Dimensional Biodegradable Structures Fabricated by Two-Photon Polymerization", Langmuir, vol. 25, pp. 3219-3223, 2009.
Melissinaki, et al., "Direct laser writing of 3D scaffolds for neural tissue engineering applications", Biofabrication, vol. 3, pp. 1-12, 2011.
Weiss, et al., "Two-Photon Polymerization of Biocompatible Photopolymers for Microstructured 3D Biointerfaces", Advanced Biomaterials, vol. 13, No. 9, pp. B264-B273, 2011.
Felfel, et al., "In vitro degradation and mechanical properties pf PLA-PCL copolymer unit cell scaffolds generated by two-photon polymerization", Biomedical Materials, vol. 11, pp. 1-14, 2011.

* cited by examiner

*Primary Examiner* — Michael L Leonard
(74) *Attorney, Agent, or Firm* — Dinsmore & Shohl LLP

(57) ABSTRACT

The present invention in general relates to acrylate end-capped urethane-based polymers, which are in particular characterized by the presence of at least 3 acrylate end-groups, thereby making them particularly suitable for further processing using multiple kinds of technologies such as 2-photon polymerization, stereolithography (SLA printing), electrospinning, film casting, porogen leaching, extrusion based 3D-printing, spray drying, cryogenic treatment, coatings, cross-linkable micelles, spincoating, and electrospraying.

15 Claims, 8 Drawing Sheets

ACRYLATE END-CAPPED URETHANE- OR UREA-BASED POLYMERS

CROSS-REFERENCES TO RELATED APPLICATIONS

This application is a national-stage application under 35 U.S.C. § 371 of International Application No. PCT/EP2019/080197, filed Nov. 5, 2019, which claims the benefit of priority to European Application No. 19178917.1, filed Jun. 7, 2019, and to European Application No. 18204369.5, filed Nov. 5, 2018.

FIELD OF THE INVENTION

The present invention in general relates to acrylate end-capped urethane- or urea-based polymers, which are in particular characterized by the presence of at least 3 acrylate end-groups, thereby making them particularly suitable for further processing using multiple kinds of technologies such as 2-photon polymerization, stereolithography (SLA printing), electrospinning, film casting, porogen leaching, extrusion based 3D-printing, spray drying, cryogenic treatment, coatings, cross-linkable micelles, spincoating, and electrospraying.

BACKGROUND TO THE INVENTION

Two-photon polymerization (2PP) is an attractive technique for the fabrication of complex three-dimensional structures with feature sizes down to 100 nm. This makes it a powerful tool for applications for which accuracy is crucial, such as tissue engineering applications, photonics, microfluidics, micro-optics etc. The commercially available 2PP resins (e.g. ORMOCERs) are composed of organic-inorganic composites, which have the advantage of easy processing with excellent CAD-CAM mimicry (computer-aided design—computer-aided manufacturing) along with good kinetics, thermal and mechanical properties. However, these resins do not exhibit biodegradability, which is desirable when targeting tissue engineering applications.

Attempts which have been made to develop biodegradable resins for 2PP applications, focused on low molecular weight monomeric/oligomeric molecules compounds. However, these formulations require low writing speeds and high laser powers to be polymerized, which is not favorable for scaffold production in larger scale and increase the risk of producing poor structures as high irradiation causes the burning effect. Moreover, most of the current solutions did not result in satisfactory CAD-CAM mimicry and shape fidelity upon 2PP processing.

For example, Claeyssens et al., 2009 developed a biodegradable 2PP resin which was composed of a low molecular weight triblock co-polymer poly(ε-caprolactone-co-trimethylenecarbonate)-b-poly(ethylene glycol)-b-poly(ε-caprolactone-co-trimethylene carbonate) ((PCL-co-PTMC)-b-PEG-b-(PCL-co-PTMC)). Even though the authors achieved sufficient biodegradation of the materials, the processed structures exhibited limited accuracy, in particular in case of complex shapes.

Weiß et al., 2011 developed a set of biodegradable resins for scaffold microfabrication. The photoresins were composed of methacrylated oligolactones having molecular weight up to 3000 g/mol. They structured the materials using writing speeds in a range of 100-5000 μm s$^{-1}$. In another study (Berg et al., 2011), they synthesized synthetic oligomeric hydrogel precursors (PG, PEG) with methacrylated functionality, and processed into microstructures using low writing speeds in the range 50-5000 μm s$^{-1}$. The formulations are covered under patent (Producing 3-dimensional, biocompatible and biodegradable structure, useful e.g. as a molded body for implants in bone- and cartilage tissue, comprises subjecting a formulation to two-photon-polymerization, DE 102009042037 A1).

Melissinaki et al., 2011 developed biodegradable low molecular weight 4-arm polylactide resin with methacrylate functionality. They processed the resins via 2PP at low writing speeds (50 μm s$^{-1}$).

Felfel et al., 2016 synthesized methacrylated random copolymers of lactic acid (LA) and ε-caprolactone (CL), and processed them via 2PP at writing speeds up to 50000 μm s$^{-1}$.

In contrast to these earlier publications, our formulations are composed of macromolecular compounds with multiple photo-reactive end groups. The photoreactive groups are linked to the backbone either directly or via means of (small) spacer groups, where the spacer groups enable flexibility of the chains and improve the reaction kinetics. The unique structure of the invented molecules overcomes the major drawbacks related with the current solutions by offering biodegradability, fast and easy printing, excellent CAD-CAM mimicry, excellent stability, tunable mechanical properties, scaling-up possibility and shape fidelity.

The compounds of the present invention are composed of polymeric backbones and multiple photoreactive end groups which are linked to the backbone either directly or via means of (small) spacer molecules, thereby obtaining acrylate end-capped urethane- or urea-based polymers. Within the framework of a different project, acrylate end-capped urethane- or urea-based polymers have already been developed earlier (WO2017005613). However, these differ from the present invention in containing a lower number of acrylate end-groups, thereby not being suitable for use in 2PP applications, in contrast to the compounds of the invention. It was specifically found that a minimum of 3 acrylate end groups is required within the context of the invention. Specifically, the presence of multiple photo-reactive groups optionally in combination with flexible spacers, enables fast crosslinking and processing at high writing speeds (>20000 μm s$^{-1}$) while maintaining the excellent CAD-CAM mimicry and shape fidelity.

The physical properties of the structures can be fine-tuned by varying the building blocks of the resins. Taking into consideration their biodegradability, biocompatibility, good kinetics and shape fidelity, the compounds of the present invention opens up the possibility to be used in multiple kinds of technologies such as 2-photon polymerization, stereolithography (SLA printing), electrospinning, film casting, porogen leaching, extrusion-based 3D printing, spray drying, cryogenic treatment, coatings, cross-linkable micelles, spincoating, and electrospraying.

SUMMARY OF THE INVENTION

In a first aspect, the present invention provides an acrylate end-capped urethane- or urea-based polymer according to formula (I):

$$X_1-Y_1-Z_1\text{-backbone-}Z_2-Y_2-X_2 \quad (I)$$

wherein:
$X_1$ and $X_2$ independently represent a moiety comprising one or more (meth)acrylate groups characterized in that the sum of acrylate groups in $X_1$ and $X_2$ is at least 3.

$Y_1$ and $Y_2$ are independently selected from the list comprising: a direct bond or a spacer; wherein said spacer is selected from the list comprising: ethylene oxide (EO), propylene oxide (PO) oligoesters and combinations thereof;

$Z_1$ and $Z_2$ independently represent a urethane- and/or urea-containing moiety;

backbone represents a polymer.

In a particular embodiment of the present invention, the present invention provides an acrylate end-capped urethane- or urea-based polymer according to formula (I):

$$X_1-Y_1-Z_1\text{-backbone-}Z_2-Y_2-X_2 \qquad (I)$$

wherein:

$X_1$ and $X_2$ independently represent a moiety comprising one or more (meth)acrylate groups;

$Y_1$ and $Y_2$ are independently selected from the list comprising: a direct bond or a spacer; wherein said spacer is selected from the list comprising: ethylene oxide (EO), propylene oxide (PO), oligoesters and combinations thereof;

$Z_1$ and $Z_2$ independently represent a urethane- and/or urea-containing moiety; and backbone represents a polymer; and wherein at least one of the following applies:
the sum of acrylate groups in $X_1$ and $X_2$ is 3 or 4; and/or
the molecular weight of the urethane- or urea-based polymer is at least 4000 Da.

Hence, in a specific embodiment of the urethane- or urea-based polymer of the invention, the sum of acrylate groups in $X_1$ and $X_2$ is 3 or 4.

Alternatively, in another specific embodiment the urethane- or urea-based polymer of the invention has a molecular weight of at least 4000 Da.

In a specific embodiment of the present invention, said backbone is selected from the list comprising: polyethers, polyamides, polysaccharides, polyoxazolines and polyesters. More in particular, said backbone may be selected from the list comprising: polyethylene glycol (PEG), polypropylene glycol (PPG), poly n-vinyl pyrrolidone (PVP), poly n-vinyl caprolactam (PNVCL), polycaprolactone (PCL), polylactic acid (PLA) and polyglycolic acid (PGA).

In another particular embodiment, said moiety comprising one or more (meth)acrylate groups is selected from the list comprising ethoxylated and/or propoxylated pentaerythritol tri(meth)acrylate (EPPETA), pentaerythritol tri(meth)acrylate (PETA), dipentaerythritol penta(meth)acrylate (DPEPA), propoxylated glycerol di(meth)acrylate (PGDA), glyceroldiacrylate (GDA), and combinations thereof.

In yet a further embodiment of the present invention, said urethane- and/or urea-containing moiety is a polyisocyanate moiety, such as selected from the list comprising diisocyanate moieties and trimers of polyisocyanates. More in particular said diisocyanate moiety is selected from the list comprising: cycloaliphatic diisocyanates, aliphatic diisocyanates and aromatic diisocyanates; preferably 5-isocyanato-1-isocyanatomethyl-1,3,3-trimethylcyclohexane (IPDI), 1,1'-methylene bis[4-isocyanatocyclohexane] (H12MDI), L-2,6-Diisocyanatohexanoic acid ethyl ester (LDI), 1,6-diisocyanatohexane (HDI), 1,6-diisocyanato-2,4,4-trimethylhexane (TMDI), 2,4-diisocyanatotoluene (TDI), 1,4-diisocyanatobenzene (BDI), 1,3-meta-tetramethylxylylene diisocyanate (TMXDI), and 1,1'-Methylenebis(4-isocyanatobenzene) (MDI); and derivatives thereof, such as 1,6-diisocyanatohexane biuret and isocyanurate. Alternatively said trimer of polyisocyanates is a trimer of 5-isocyanato-1-isocyanatomethyl-1,3,3-trimethylcyclohexane (trimer of isophorone diisocyanate, IPDI).

The present invention also provides the use of an acrylate end-capped urethane- or urea-based polymer as defined herein in a method selected from the list comprising: 2-photon polymerization, stereolithography (SLA printing), electrospinning, film casting, porogen leaching, extrusion based 3D-printing, spray drying, cryogenic treatment, coatings, cross-linkable micelles, spin coating, and electrospraying.

In a further aspect, the present invention provides the use of a urethane- or urea-based polymer according to formula (II): in a method selected from the list comprising: 2-photon polymerization, stereolithography (SLA printing), electrospinning, film casting, porogen leaching, extrusion-based 3D printing, spray drying, cryogenic treatment, coatings, cross-linkable micelles, spincoating, and electrospraying;

$$X_1-Y_1-Z_1\text{-backbone-}Z_2-Y_2-X_2 \qquad (II)$$

wherein:

$X_1$ and $X_2$ independently represent a moiety comprising one or more (meth)acrylate groups characterized in that the sum of acrylate groups in $X_1$ and $X_2$ is at least 3.

$Y_1$ and $Y_2$ are independently selected from the list comprising: a direct bond or a spacer; wherein said spacer is selected from the list comprising: ethylene oxide (EO), propylene oxide (PO) oligoesters and combinations thereof;

$Z_1$ and $Z_2$ are independently a direct bond or represent a urethane- and/or urea-containing moiety;

backbone represents a polymer.

In another particular embodiment, the present invention provides the use of a urethane- or urea-based polymer according to formula (II): in a method selected from the list comprising: 2-photon polymerization, stereolithography (SLA printing), electrospinning, film casting, porogen leaching, extrusion based 3D-printing, spray drying, cryogenic treatment, coatings, cross-linkable micelles, spincoating, and electrospraying;

$$X_1-Y_1-Z_1\text{-backbone-}Z_2-Y_2-X_2 \qquad (II)$$

wherein:

$X_1$ and $X_2$ independently represent a moiety comprising one or more (meth)acrylate groups characterized in that the sum of acrylate groups in $X_1$ and $X_2$ is at least 3.

$Y_1$ and $Y_2$ are independently selected from the list comprising: a direct bond or a spacer; wherein said spacer is selected from the list comprising: ethylene oxide (EO), propylene oxide (PO) oligoesters and combinations thereof;

$Z_1$ and $Z_2$ are independently a urethane- and/or urea-containing moiety;

backbone represents a polymer; and wherein said polymer of formula (II) comprises one or more urethane moieties.

BRIEF DESCRIPTION OF THE DRAWINGS

With specific reference now to the figures, it is stressed that the particulars shown are by way of example and for purposes of illustrative discussion of the different embodiments of the present invention only. They are presented in the cause of providing what is believed to be the most useful and readily description of the principles and conceptual aspects of the invention. In this regard no attempt is made to show structural details of the invention in more detail than is necessary for a fundamental understanding of the invention. The description taken with the drawings making apparent to those skilled in the art how the several forms of the invention may be embodied in practice.

Bottom row: SEM images of the microscaffolds printed from PEG-based urethanes end-capped with (e) monoacrylated oligoethylene-glycol, (f) PETA, (g) EPPETA and (h) DPEPA. (scale bars: 50 µm).

Figure 5:
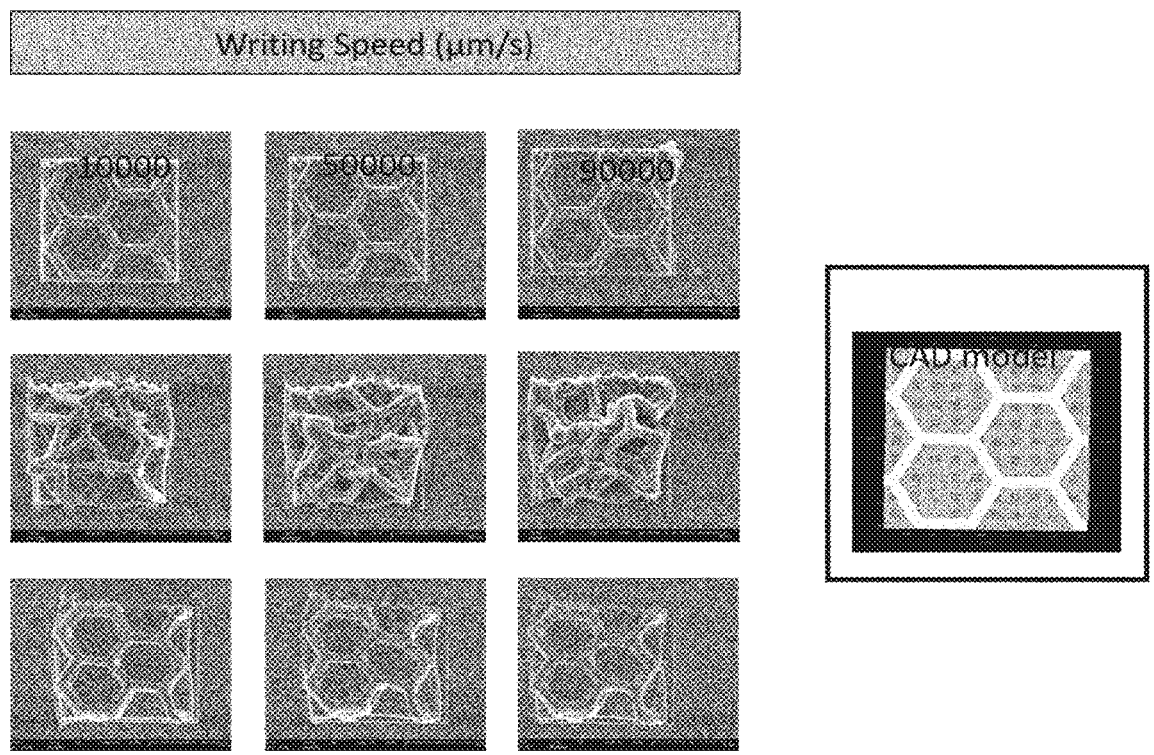

FIG. 5: SEM images of the microscaffolds printed with writing speeds ranging from 10 to 90 mm/s from PEG-based urethanes end-capped with PETA (top line), 4-arm star-shape PCL-based urethanes end-capped with monoacrylated oligoethylene glycol on each-arm (middle line) and PEG-based urethanes end-capped with monoacrylated oligoethylene glycol (bottom line).
(scale bars: 50 µm)

Figure 6:
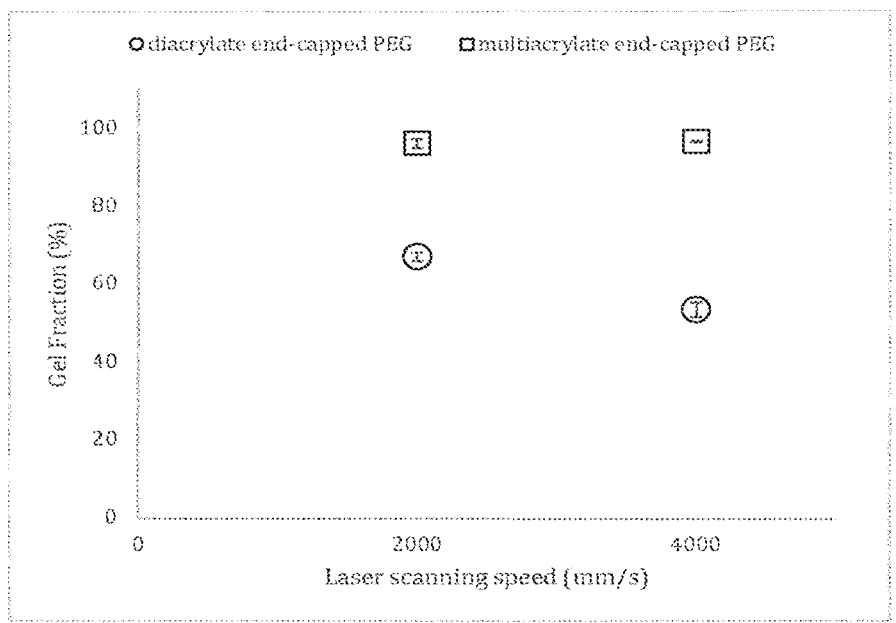
Figure 7:
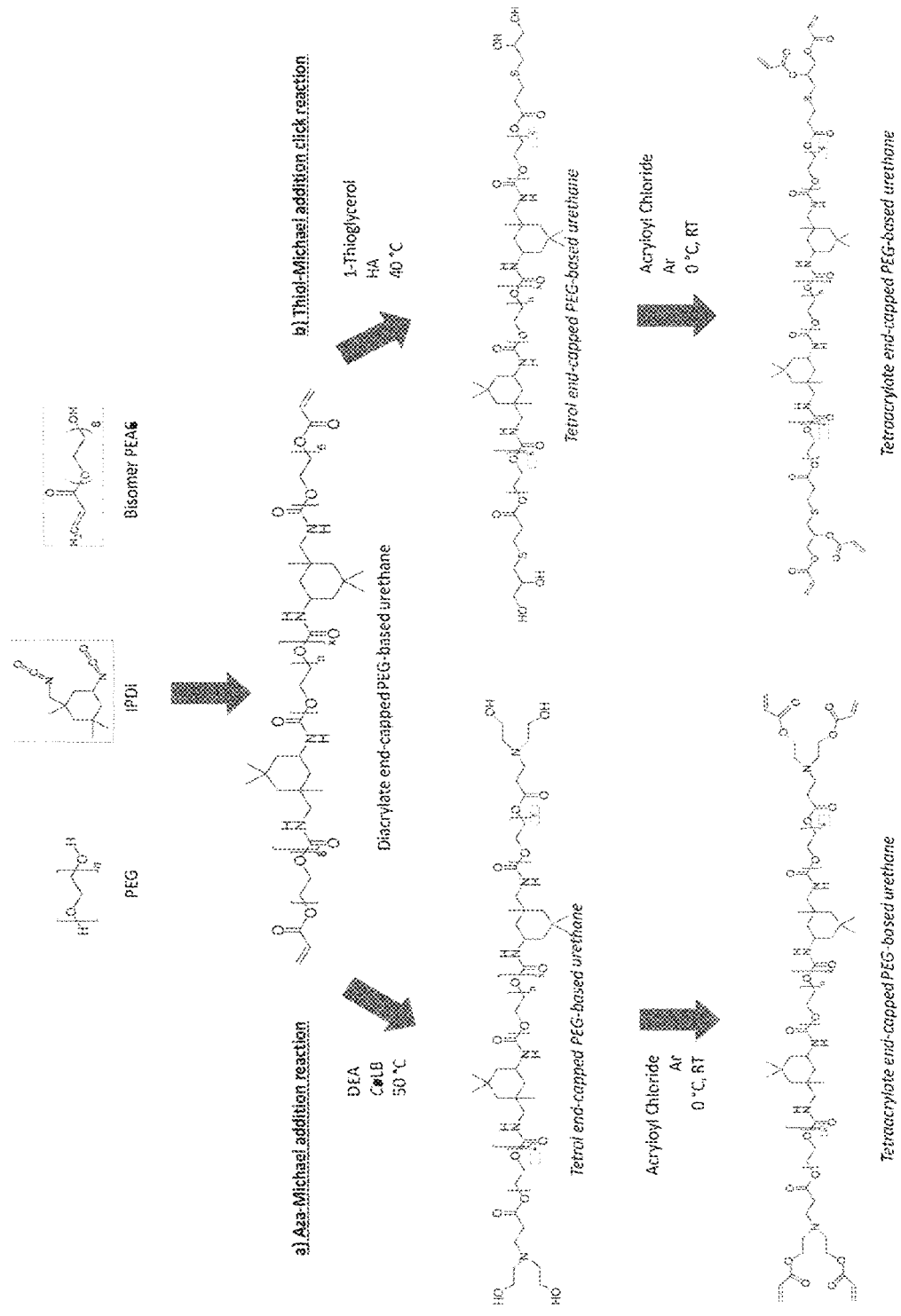
Figure 9:
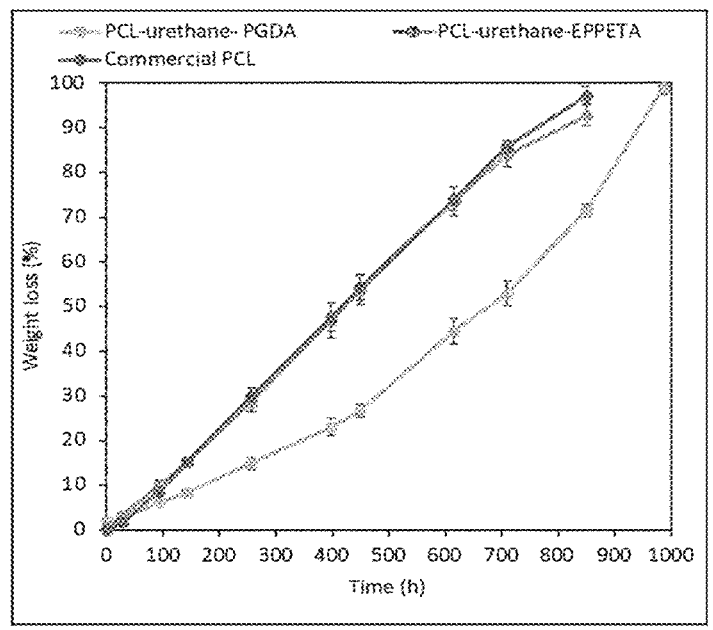
Figure 10:
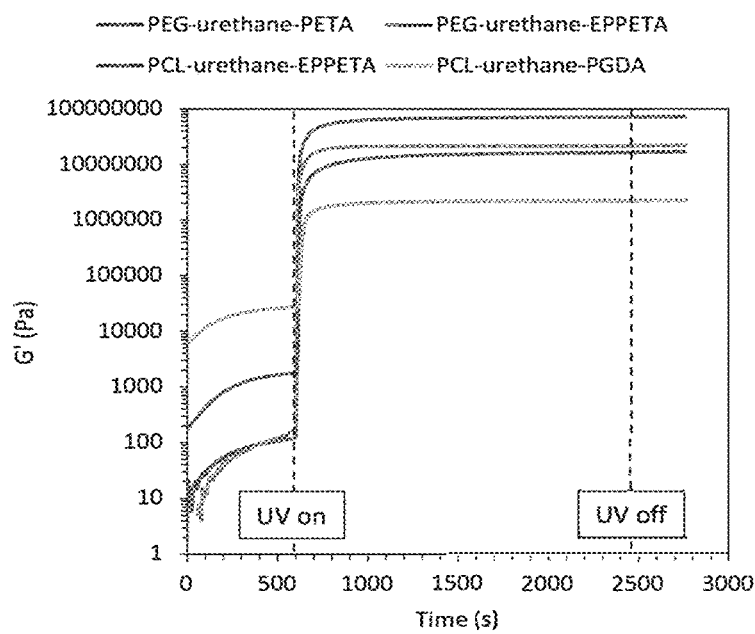

FIG. 6: Gel fractions of SLA-processed multi- and diacrylate end-capped PEG based urethanes as a function of laser scanning speed FIG. 7: Reaction schemes of tetraacrylate end-capped PEG-based urethanes FIG. 8: $^1$H-NMR spectrum of tetraacrylate end-capped PEG-based urethane synthesized via aza-Michael addition reaction and acrylation FIG. 9: Weight loss of crosslinked precursors as a function of time FIG. 10: Storage moduli of PEG-urethane-PETA, PEG-urethane-EPPETA, PCL-urethane-EPPETA and PCL-urethane-PGDA as a function of time during UV irradiation

DETAILED DESCRIPTION OF THE INVENTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

As used in the specification and the appended claims, the singular forms "a", "an", and "the" include plural referents unless the context clearly dictates otherwise. By way of example, "a compound" means one compound or more than one compound. The terms described herein and others used in the specification are well understood to those in the art.

As already mentioned hereinbefore, in a first aspect the present invention provides an acrylate end-capped urethane- or urea-based polymer according to formula (I):

X₁—Y₁—Z₁-backbone-Z₂—Y₂—X₂ 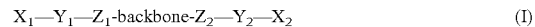 (I)

wherein:
X₁ and X₂ independently represent a moiety comprising one or more (meth)acrylate groups characterized in that the sum of acrylate groups in X₁ and X₂ is at least 3.
Y₁ and Y₂ are independently selected from the list comprising: a direct bond or a spacer; wherein said spacer is selected from the list comprising: ethylene oxide (EO), propylene oxide (PO), oligoesters and combinations thereof;
Z₁ and Z₂ independently represent a urethane- and/or urea-containing moiety;
backbone represents a polymer.

In a particular embodiment of the present invention, the present invention provides an acrylate end-capped urethane- or urea-based polymer according to formula (I):

X₁—Y₁—Z₁-backbone-Z₂—Y₂—X₂ (I)

wherein:
X₁ and X₂ independently represent a moiety comprising one or more (meth)acrylate groups;
Y₁ and Y₂ are independently selected from the list comprising: a direct bond or a spacer; wherein said spacer is selected from the list comprising: ethylene oxide (EO), propylene oxide (PO), oligoesters and combinations thereof;
Z₁ and Z₂ independently represent a urethane- and/or urea-containing moiety; and
backbone represents a polymer; and
wherein at least one of the following applies:
the sum of acrylate groups in X₁ and X₂ is 3 or 4; and/or
the molecular weight of the urethane- or urea-based polymer is at least 4000 Da.

Hence, in a specific embodiment of the urethane- or urea-based polymer of the invention, the sum of acrylate groups in X₁ and X₂ is 3 or 4.

Alternatively, in another specific embodiment of the present invention, said urethane- or urea-based polymer has a molecular weight of at least 4000 Da.

In the context of the present invention, the term "acrylate" is meant to be salts, esters and conjugate bases of acrylic acid and it derivatives. Acrylates contain vinyl groups, i.e. 2 carbon atoms double bonded to each other, directly attached to a carbonyl carbon. An acrylate moiety is typically represented as follows:

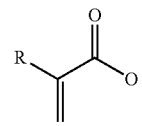

wherein R represents —H in the event of acrylates or an alkyl group such as for example a methyl (—CH₃) moiety, in the event of methacrylates. The (meth)acrylate groups according to the present invention are attached to the remainder of the polymer via the —O— linker, such that the double bonded carbon atom faces outwardly of the molecules.

The term "alkyl" by itself or as part of another substituent refers to a fully saturated hydrocarbon of Formula $C_xH_{2x+1}$ wherein x is a number greater than or equal to 1. Generally, alkyl groups of this invention comprise from 1 to 20 carbon atoms. Alkyl groups may be linear or branched and may be substituted as indicated herein. When a subscript is used herein following a carbon atom, the subscript refers to the number of carbon atoms that the named group may contain. Thus, for example, $C_{1-4}$alkyl means an alkyl of one to four carbon atoms. Examples of alkyl groups are methyl, ethyl, n-propyl, i-propyl, butyl, and its isomers (e.g. n-butyl, i-butyl and t-butyl); pentyl and its isomers, hexyl and its isomers, heptyl and its isomers, octyl and its isomers, nonyl and its isomers; decyl and its isomers. $C_1$-$C_6$ alkyl includes all linear, branched, or cyclic alkyl groups with between 1 and 6 carbon atoms, and thus includes methyl, ethyl, n-propyl, i-propyl, butyl and its isomers (e.g. n-butyl, i-butyl and t-butyl); pentyl and its isomers, hexyl and its isomers, cyclopentyl, 2-, 3-, or 4-methylcyclopentyl, cyclopentylmethylene, and cyclohexyl.

The term "end-capped" as used herein means that the (meth)acrylate groups of the molecules of the invention are located at the outer parts of the polymer molecules, i.e. they face outwardly of the molecules.

The present invention is in particular characterized in that the claimed molecules comprise at least 3 (meth)acrylate end-groups. These end-groups are represented by the annotations $X_1$ and $X_2$ in formula (I) and (II), and should be interpreted such that each of these contains at least one (meth)acrylate groups. As such, at least one of $X_1$ and $X_2$ contains at least two (meth)acrylate end-group. For example, where $X_1$ contains a single (meth)acrylate end-group, $X_2$ contains at least two (meth)acrylate end-group; alternatively where $X_2$ contains a single (meth)acrylate end-group, $X_1$ contains at least two (meth)acrylate end-group. Nevertheless, each of said $X_1$ and $X_2$ groups may contain 1, 2, 3, 4 or 5 (meth)acrylate end-groups, in as far as the sum of (meth)acrylate end-groups of both $X_1$ and $X_2$ groups taken together, equals at least 3. As detailed herein above, in a specific embodiment of the present invention, the sum of acrylate groups in $X_1$ and $X_2$ equals 3 or 4

In the context of the present invention, the term "urethane-based polymer" is meant to be a polymeric polymer containing one or more carbamate or urethane links. A carbamate is an organic compound derived from carbamic acid ($NH_2COOH$), and as such a carbamate link may be generally represented as follows:

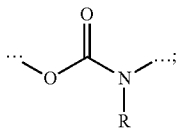

wherein each of said " . . . " represents an attachment point to the remainder of the polymer molecule. In the context of the present invention, the claimed polymers contain at least one carbamate linker, however, they may also contain several carbamate linkers such as 1, 2, 3, 4, or 5 carbamates.

In the context of the present invention, the term "urea-based polymer" is meant to be a polymeric polymer containing one or more urea links, such as represented by —NR—(C=O)—NR—.

In the context of the present invention, the term "spacer" is meant to be a moeity intended to provide a (flexible) hinge between 2 other elements of the molecule in which it is included, thereby spatially separating said elements. In the context of the present invention, a spacer may be present between the X and Z components if desired. Said spacer may for example only be present at one side of the molecule, whereas it may be absent on the other side. In that respect $Y_1$ may for example be a spacer, whereas $Y_2$ may represent a direct bond and vice versa. In the context of the invention, any type of suitable moeity may be used as a spacer, however, it is preferably selected from the list comprising ethylene oxide (EO), propylene oxide (PO), oligoesters and combinations thereof.

In the context of the present invention, ethylene oxide (or alternatively polyethylene glycol) and propylene oxide (or alternatively polypropylene glycol) represent 2 examples of the more general term alkylene oxide. In the context of the present invention, the term oligoester is meant to be an oligomer chain containing a small number of repeating ester units R—C(=O)—OR'.

Term "polyisocyanate" as used herein is meant to be an organic group comprising at least two isocyanate groups. An isocyanate is a functional group represented by the formula R—N=C=O. As such, diisocyanate groups are organic groups containing 2 isocyanate moieties.

The term "urethane- and/or urea-containing moiety" as used herein is meant to be moiety composed of organic units joined by carbamate (urethane) links, i.e. —NH—(C=O)—O—; and/or urea links, i.e. —NH—(C=O)—NH—; or more generally: —NR—(C=O)—O— and —NR—(C=O)—NR—. Hence, this moiety may contain only urethane linkers. Alternatively, this moiety may contain only urea linkers. Moreover, this moiety may also contain a combination of urethane and urea linkers.

In a specific embodiment of the present invention, the backbone as suitable within the context of the invention may be selected from the list comprising: polyethers, polyamides, polysaccharides, polyoxazolines and polyesters. The terms polyether, polyamide, polysaccharide, polyoxazoline and polyester are meant to represent polymer moieties containing multiple ether (R—O—R'), amide (R—C(=O)—NR'R"), saccharide (sugars, starch, cellulose, alginate, carrageenan, dextran), oxazoline (5-membered heterocyclic compound containing one O and one N atom) and ester (R—C(=O)—OR') groups respectively.

More specifically, the backbone as suitable within the context of the present invention, may be selected from any of the following (and combinations thereof):

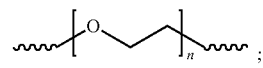

polyethylene glycol (PEG)

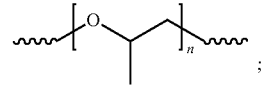

polypropylene glycol (PPG)

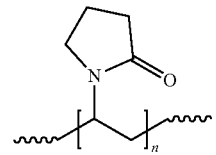

poly n-vinyl pyrrolidone (PVP);

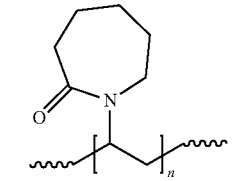

poly n-vinyl caprolactam (PVNCL);

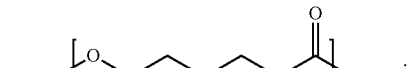

polycaprolactone (PCL)

-continued

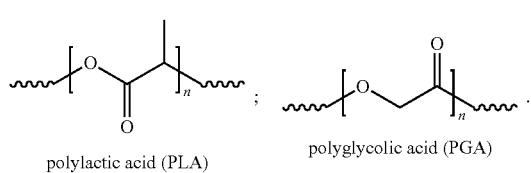

polylactic acid (PLA)   polyglycolic acid (PGA)

Particularly interesting urethane- or urea-based polymers, within the context of the present invention, are those having a backbone with a high molecular weight, such as about 2000 Da; about 3000 Da; about 4000 Da; about 5000 Da, about 6000 Da, about 7000 Da, about 8000 Da, about 9000 Da, about 10000 Da.

Particularly interesting urethane- or urea-based polymers, within the context of the present invention, are those having a high molecular weight, such as about 4000 Da; about 5000 Da, about 6000 Da, about 7000 Da, about 8000 Da, about 9000 Da, about 10000 Da. The higher molecular weight of the polymers facilitates the flexibility thereof, and accordingly the processability in processing techniques such as electrospinning and 2PP.

In another particular embodiment, the moiety comprising one or more (meth)acrylate groups is selected from the list comprising:

ethoxylated and/or propoxylated pentaerythritol tri(meth)acrylate (EPPETA):

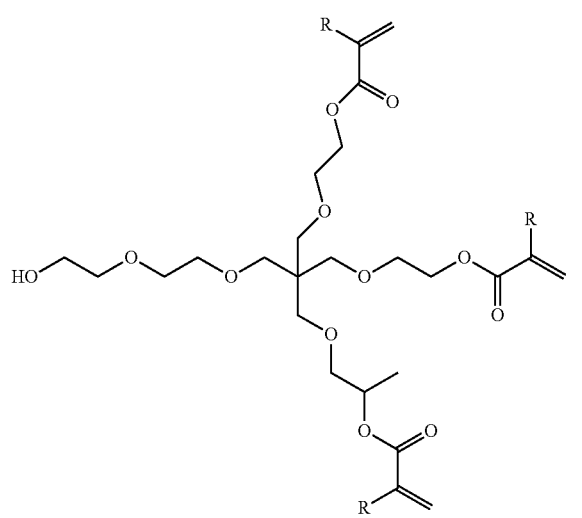

R: H or CH$_3$ pentaerythritol tri(meth)acrylate (PETA):

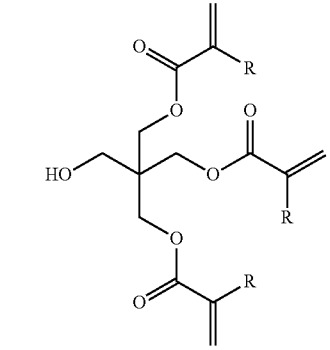

R: H or CH$_3$ ethoxylated and/or propoxylated dipentaerythritol penta(meth)acrylate (DPEPA):

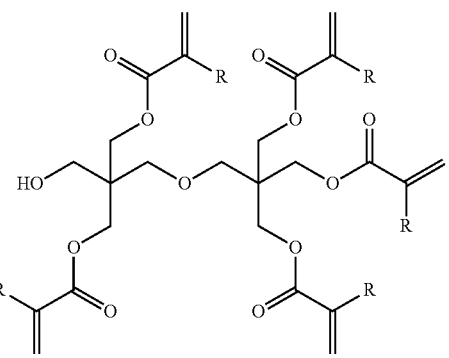

R: H or CH$_3$ ethoxylated and/or propoxylated glycerol di(meth)acrylate (EGDA, PGDA, EPGDA):

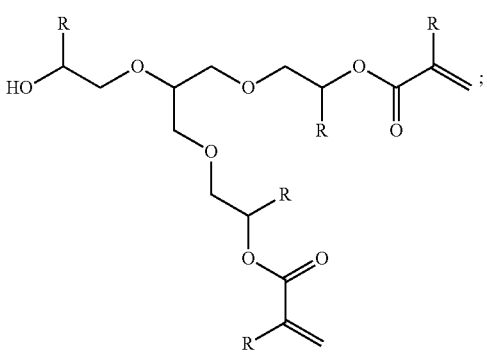

R: H or CH$_3$ glycerol diacrylate (GDA)

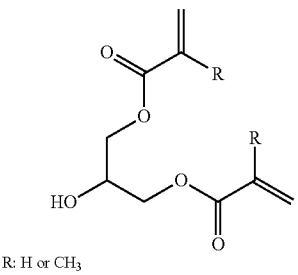

R: H or CH₃ and combinations thereof.

Each of the above structures are merely examples of acrylated polyol structures within the context of the invention. In that respect, for example EPPETA is a mixture of different compounds such as 4 oxyethylated (OE) units in combination with one propoxylated (OP) unit on the same branch. Alternatively, the 4 OE units may also be present on one branch, whereas the OP unit is present on another branch. Multiple additional examples can be designed as such, and are equally suitable for use within the context of the invention. Moreover, while tri(acrylate) moieties are in general the most abundant within the context of this invention, a minority of the corresponding moieties may also be fully (meth)acrylated, tri, di, or mono (meth)acrylates, or may even contain no meth(acrylates). This interpretation, of course, does not only apply for EPPETA, but also applies for the other acrylated polyol structures described in the current application.

In yet a further embodiment of the present invention, said urethane- and/or urea-containing moiety is a polyisocyanate moiety, such as selected from the list comprising diisocyanate moieties and trimers of polyisocyanates. More in particular said diisocyanate moiety is selected from the list comprising: cycloaliphatic diisocyanates, aliphatic diisocyanates and aromatic diisocyanates; preferably 5-isocyanato-1-isocyanatomethyl-1,3,3-trimethylcyclohexane (IPDI), 1,1'-methylene bis[4-isocyanatocyclohexane] (H12MDI), L-2,6-Diisocyanatohexanoic acid ethyl ester (LDI), 1,6-diisocyanatohexane (HDI), 1,6-diisocyanato-2,4,4-trimethylhexane (TMDI), 2,4-diisocyanatotoluene (TDI), 1,4-diisocyanatobenzene (BDI), and 1,1'-Methylenebis(4-isocyanatobenzene) (MDI); and derivatives thereof, such as 1,6-diisocyanatohexane biuret and isocyanurate. Alternatively said trimer of polyisocyanates is trimer of 5-isocyanato-1-isocyanatomethyl-1,3,3-trimethylcyclohexane (isophorone diisocyanate, IPDI).

The present invention also provides the use of an acrylate end-capped urethane- or urea-based polymer as defined herein in a method selected from the list comprising: 2-photon polymerization, stereolithography (SLA printing), electrospinning, film casting, porogen leaching, extrusion based 3D-printing, spray drying, cryogenic treatment, coatings, cross-linkable micelles, spin coating, and electrospraying.

In a further aspect, the present invention provides the use of a urethane- or urea-based polymer according to formula (II): in a method selected from the list comprising: 2-photon polymerization, stereolithography (SLA printing), electrospinning, film casting, porogen leaching, extrusion based 3D-printing, spray drying, cryogenic treatment, coatings, cross-linkable micelles, spincoating, and electrospraying;

$$X_1-Y_1-Z_1\text{-backbone-}Z_2-Y_2-X_2 \quad (II)$$

wherein:
$X_1$ and $X_2$ independently represent a moiety comprising one or more (meth)acrylate groups characterized in that the sum of acrylate groups in $X_1$ and $X_2$ is at least 3.
$Y_1$ and $Y_2$ are independently selected from the list comprising: a direct bond or a spacer; wherein said spacer is selected from the list comprising: ethylene oxide (EO), propylene oxide (PO) oligoesters and combinations thereof;
$Z_1$ and $Z_2$ are independently a direct bond or represent a urethane- and/or urea-containing moiety;
backbone represents a polymer; and
wherein said polymer of formula (II) comprises one or more urethane moieties.

In another particular embodiment, the present invention provides the use of a urethane- or urea-based polymer according to formula (II): in a method selected from the list comprising: 2-photon polymerization, stereolithography (SLA printing), electrospinning, film casting, porogen leaching, extrusion based 3D-printing, spray drying, cryogenic treatment, coatings, cross-linkable micelles, spincoating, and electrospraying;

$$X_1-Y_1-Z_1\text{-backbone-}Z_2-Y_2-X_2 \quad (II)$$

wherein:
$X_1$ and $X_2$ independently represent a moiety comprising one or more (meth)acrylate groups characterized in that the sum of acrylate groups in $X_1$ and $X_2$ is at least 3;
$Y_1$ and $Y_2$ are independently selected from the list comprising: a direct bond or a spacer; wherein said spacer is selected from the list comprising: ethylene oxide (EO), propylene oxide (PO) oligoesters and combinations thereof;
$Z_1$ and $Z_2$ are independently a urethane- and/or urea-containing moiety;
backbone represents a polymer; and
wherein said polymer of formula (II) comprises one or more urethane moieties.

The compounds of the present invention can be prepared according to the reaction schemes provided in the examples hereinafter, but those skilled in the art will appreciate that these are only illustrative for the invention and that the compounds of this invention can be prepared by any of several standard synthetic processes commonly used by those skilled in the art of organic chemistry.

2-photon-polymerization (2PP) is a method to generate 3D structures with sub-micrometer resolution upon simultaneous absorption of two photons by the photosensitive material. This is achieved by focusing ultra short laser pulses into the photosensitive material, which initiates a chemical reaction within the focal region.

Stereolithography (SLA) is a solid freeform fabrication technique (SFF) that allows fabrication of structures using a computer-aided design (CAD) file. The fabrication of structures via SLA techniques is based on spatially controlled solidification of a liquid photosensitive resin using a computer-controlled laser beam or digital light projector. Surface of the resin is scanned by a laser to produce 2D patterns (laser systems) or the complete layer is cured at once by projecting a two-dimensional pixel-pattern (projection systems), where the fabrication platform moves in the Z-direction after curing of each layer to build up the 3D structure. After the process is completed, the non-cured resin is washed-off upon immersion into a suitable solvent.

Electrospinning is a technique for creation of nano- or micro-scaled fibers from polymer solutions using an electric field. The pre-polymer is dissolved in a suitable solvent, placed in a capillary nozzle, and subjected to high electric field. As the liquid droplet of pre-polymer solution gets charged, the electrostatic repulsion overcomes the surface tension of the liquid, which leads to the formation of Taylor cone and ejection of the charged jet of pre-polymer solution from the capillary nozzle. The jet undergoes elongation and drying during the flight between capillary nozzle and finally deposited on the grounded collector as nano- or microfibers. The prepolymer fibers are crosslinked upon UV illumination.

Film casting is a method to create films by injecting a polymer melt or polymer solution between two glass plates separated with a spacer with certain thickness. The glass plates are subsequently irradiated with UV light to obtain crosslinked sheets.

Porogen leaching is a method to fabricate porous structures by mixing particles with pre-polymer solution or melt, and removing the particles from the crosslinked polymer using a suitable solvent.

Extrusion-based 3D printing is a solid freeform fabrication technique offering the design of either cell-free or cell-laden matrices via layer by layer deposition of the continuous strands. Two variations of this technique, is available; printing from melt and printing from solution. The scaffolds can be UV illuminated during or after 3D printing in order to enable crosslinking.

Cryogenic treatment is a method to create porous structures via freeze drying process. The polymer precursor is dissolved in water and the solution is then frozen to create ice crystals. The ice crystals are removed via freeze drying resulting in a porous polymer structure.

Coatings are top-layers formed on various substrates using pre-polymer solutions or melts. The pre-polymer layers can be applied on substrates using different techniques such as dip-coating, spin-coating, spray-coating, extrusion coating and subsequently crosslinked via UV irradiation.

Electrospraying is a method to fabricate polymeric nano- or micro particles by applying high electric field to the pre-polymer solution. The pre-polymer solution flowing out of capillary nozzle is subjected to high electric field and forms a jet. The charged jet destabilize due to the low concentration of polymer solution and breaks down to fine particles being deposited on the collector. The fine particles formed due to the electric field is crosslinked using UV irradiation. Size of the droplets can be adjusted by varying the parameters such as solution concentration, flow rate and applied voltage.

In some of the above techniques, a photo initiator is used as detailed above. In a specific embodiment, said photo initiator is selected from the list of 2-hydroxy-2-propyl 4-(hydroxyethoxy)phenyl ketone (Irgacure 2959), 1-hydroxycyclohexyl phenyl ketone (Additol CPK, available from Allnex), 1,4-bis(4-(N,N-bis(6-(N,N,N-trimethyl ammonium)hexyl)amino)-styryl)-2,5-dimethoxybenzene tetra iodide) (WSPI), lithium salt of 2,4,6-trimethylbenzoyldiphenylphosphine oxide (TPO), P2CK, G2CK, E2CK, M2CMK, macromolecular photo initiators, or mixtures thereof. The selection of these photo initiators is of particular interest as they have been shown to display reduced cytotoxicity (Li et al., RSC Advances, 26 Jun. 2013). This is advantageous for biomedical applications.

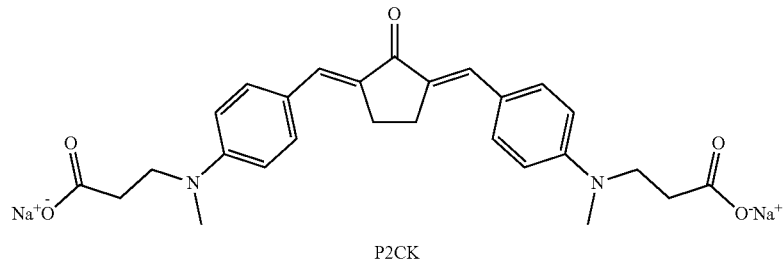

P2CK

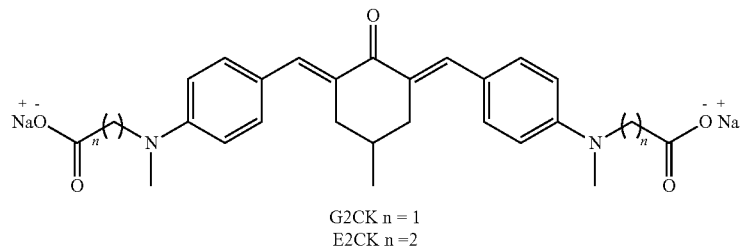

G2CK n = 1
E2CK n = 2

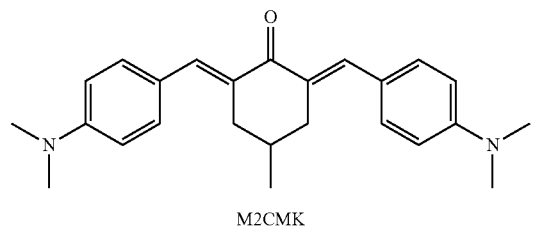

M2CMK

EXAMPLES

Example 1: Synthesis of Acrylate End-Capped Urethane-Based Polymers

Polycaprolactone diol (PCL diol) or poly(ethyleneglycol) (PEG) with MW ranging between 2000-10000 g/mol was obtained from Merck. Butylhydroxytoluene was obtained from Innochem GMBH. Isophorone diisocyanate (IPDI) was obtained from Sigma Aldrich. PETA, EPPETA, and PGDA (end-capping agents) were obtained from Allnex. Bismuth neodecanoate was obtained from Umicore.

Figure 1:
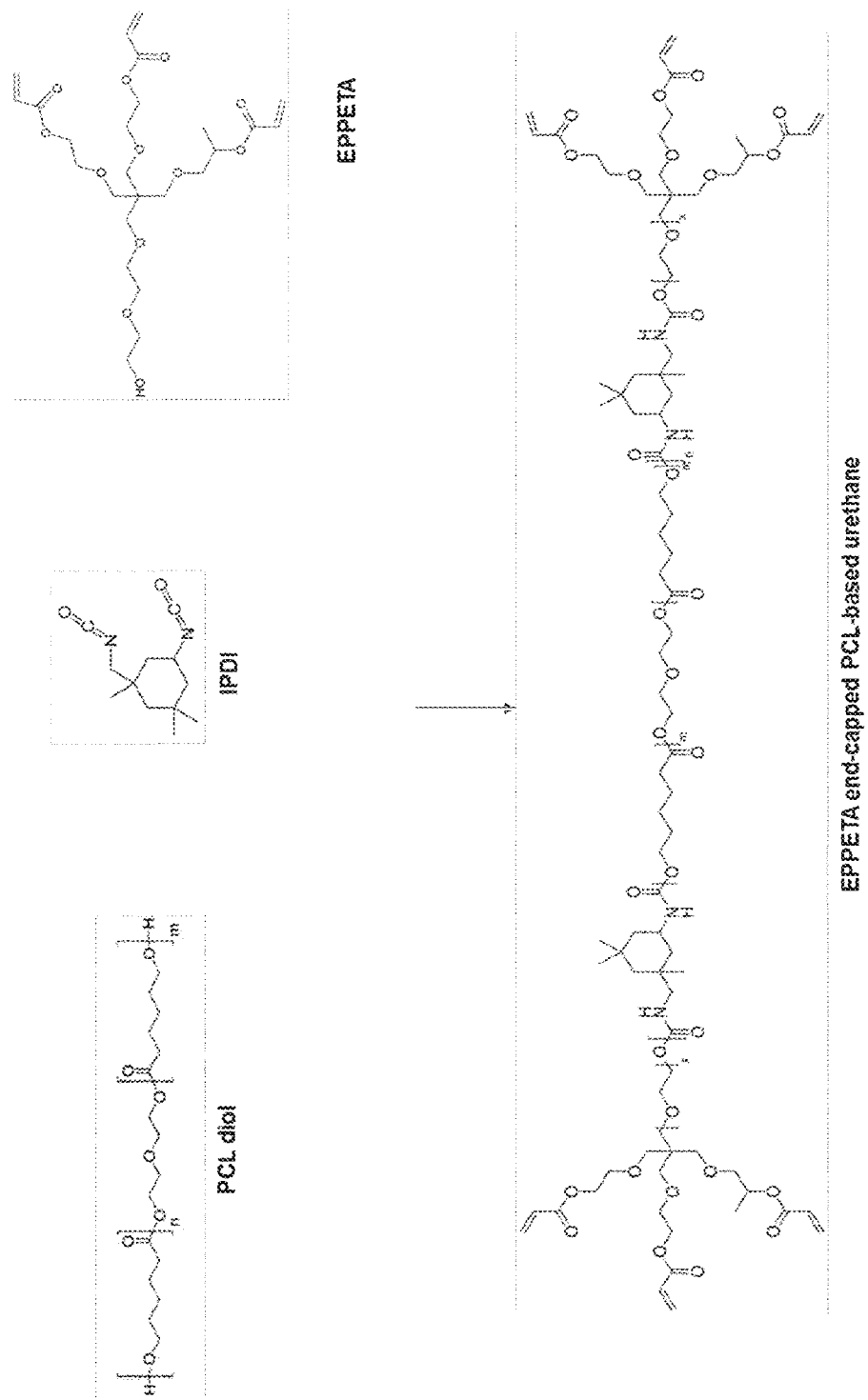
FIG. 1: Synthesis of EPPETA end-capped PCL-based urethane.

Urethane-based polyester and polyethers with multi-acrylate end-groups were prepared as indicated in FIG. 1 by reacting the polyether or polyester diol with 2 eq. of isophorone diisocyanate (IPDI) and 300 ppm of bismuth neodecanoate. Reaction temperature was held at 75° C. After two hours, the temperature was set at 70° C. and 2 eq. end-capping agent and 300 ppm of bismuth neodecanoate were added to the reactor under an air flux. The reaction was maintained at 80° C. until no absorption band is observed at 2270 $cm^{-1}$ via Fourier Transform Infrared Spectroscopy (FTIR, Perkin Elmer) indicating that the NCO groups of IPDI have completely reacted.

Figure 2:
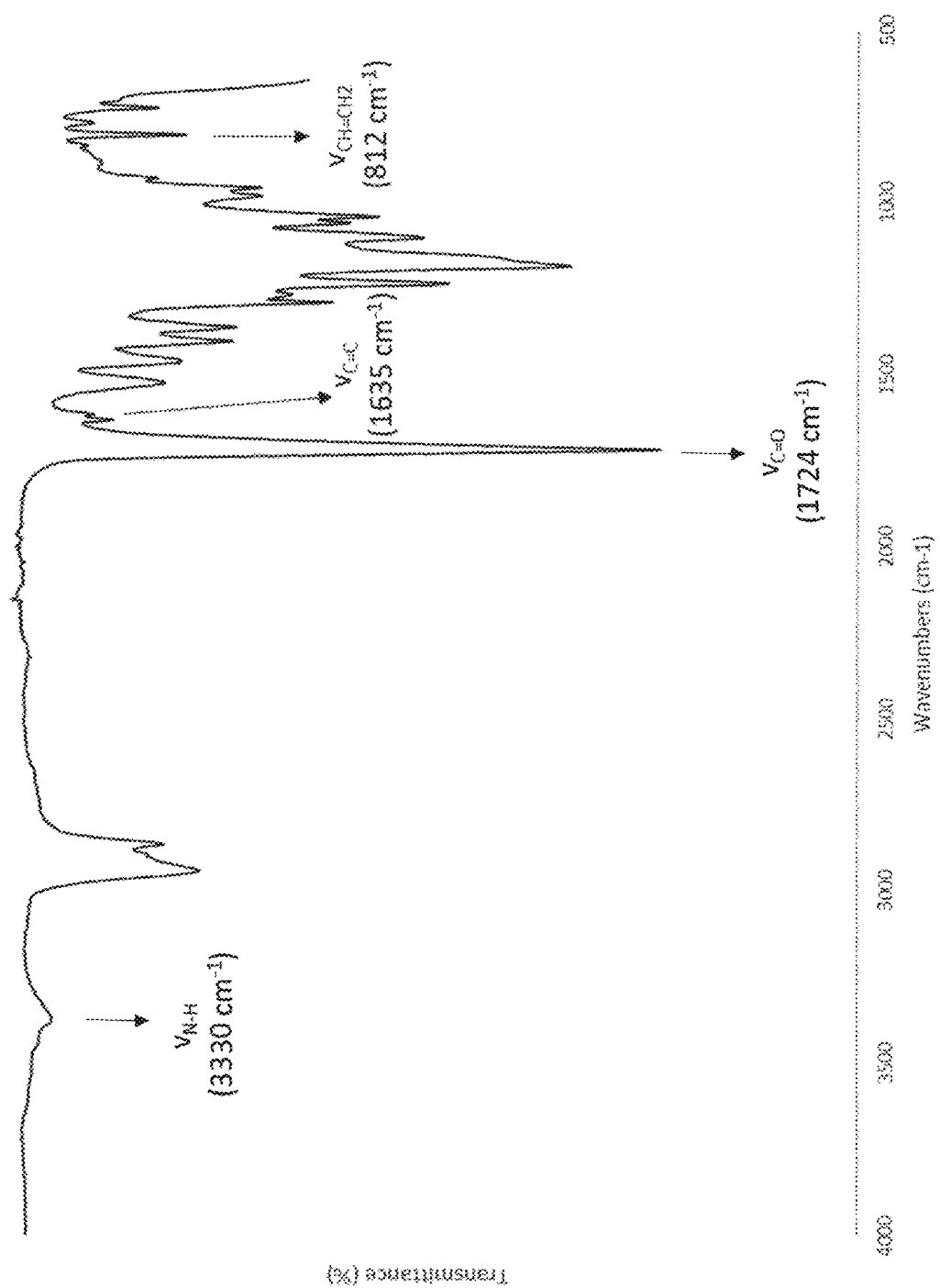
FIG. 2: FTIR spectrum of EPPETA end-capped PCL-based urethane.

Characterization of EPPETA End-Capped PCL-Based Urethane Via Infrared Spectroscopy ATR FT-IR spectroscopy is a commonly used technique in the structural analysis of chemical compounds. Fourier Transform Infrared Spectroscopy was performed on a FT-IR spectrometer (Perkin Elmer) operating in Attenuated Total Reflection (ATR) mode. Spectrum of the PCL-based urethane end capped with EPPETA was recorded for the range of 600-4000 $cm^{-1}$ with 8 scans. A diamond crystal with ZnSe lenses was used, with a refractive index of 2.4 at 1000 $cm^{-1}$. The resulting spectrum is indicated in FIG. 2.

No absorption band of NCO groups has been observed after completion of the reaction, which confirms the isocyanate groups of IPDI have completely reacted with the hydroxyl groups of the EPPETA end-capping agent. Characteristic absorption bands of urethane groups are N—H stretching (3330 $cm^{-1}$), N—H bending vibration (1520 $cm^{-1}$) and amide 11 band (1242 $cm^{-1}$). The absorption bands at 1635 and 812 $cm^{-1}$ correspond to the acrylate double bonds of EPPETA end-capped PCL-based urethane.

Characterization of EPPETA End-Capped PCL-Based Urethane Via $^1$H-NMR Spectroscopy The $^1$H-NMR spectrum of the precursors was recorded via a Bruker Avance 300 MHz Spectrometer. The precursors were dissolved in deuterated chloroform (CDCl$_3$, Euriso-Top) before analysis. Spectra were analyzed using the MestReNova software (version 6.0.2).

Figure 3:
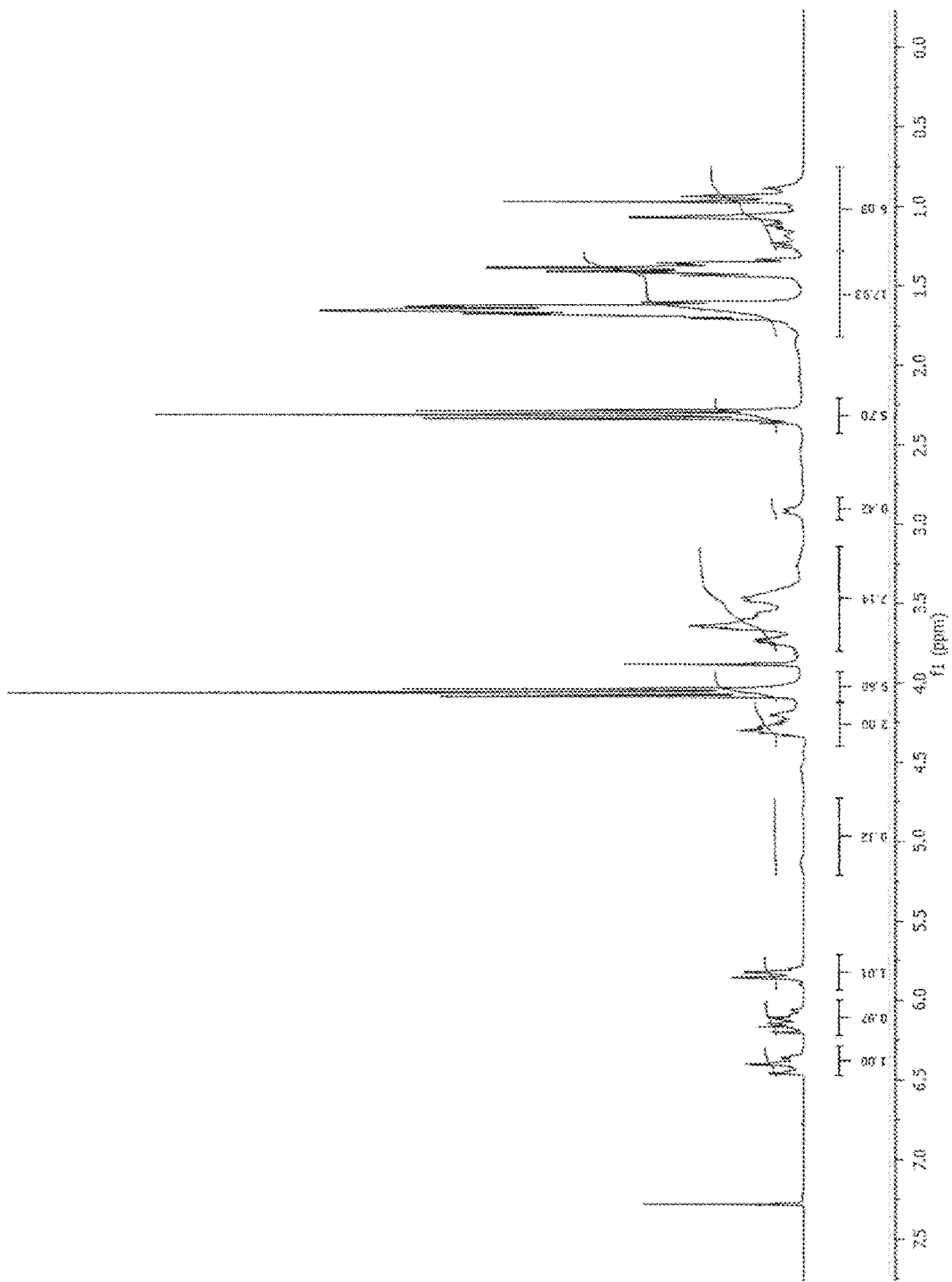
FIG. 3: $^1$H-NMR spectrum of EPPETA end-capped PCL-based urethane.

The $^1$H-NMR spectrum is shown in FIG. 3. The signals around 1.5, 2.3 and 4 ppm corresponds to the $CH_2$ protons in the caprolactone units. The signal attributed to methylene protons present in the ethylene oxide spacers can be observed from 3.3 to 3.8 ppm. The signal between 0.7 and 1.3 ppm correspond to the protons in the cyclic methylene units of IPDI and the signals at 5.8, 6.1 and 6.3 belong to acrylate protons.

Example 2: Processing of Acrylate End-Capped Urethane-Based Polymers into Thin Films The precursors are heated in the oven at 60° C. until they are completely melted. The melt is then placed in between two glass plates separated by a 1 mm silicon spacer. The glass plates are left for 10 minutes at room temperature to let the precursor cool down. The samples are crosslinked upon UV-A irradiation for 30 minutes. UV irradiation is applied by means of a LWUV-lamp model VL-400L (Vilber Lourmat, Marne La Vallee, France), with an intensity of 10 mW/$cm^2$ and a wavelength range of 250-450 nm.

Characterization of the Thin Films by Determining Gel Fraction

After crosslinking, the thin films are punched out as disks with 10 cm diameter and weighed ($W_1$) using an analytical balance. The samples were soaked into chloroform or double distilled water. At the end of incubation, the samples were dried and weighed ($W_2$). The gel fraction (GF) was calculated using the formula GF (%)=$W_2/W_1$*100%. The gel fractions of the crosslinked precursors can be seen in Table 1.

TABLE 1

Gel fractions and Young's moduli of PEG-urethane-EPPETA, PCL-urethane-EPPETA and PCL-urethane-PGDA

| Precursor | Backbone MW (g/mol) | Incubation medium* | Precursor conc. prior to UV crosslinking (wt %) | Gel fraction after UV curing (%) | Young's Modulus (MPa) |
|---|---|---|---|---|---|
| PEG-urethane-EPPETA | 2000 | Chloroform | 100 | 99.1 | 25.9 ± 0.7 |
| PCL-urethane-EPPETA | 2000 | Chloroform | 100 | 98.5 | 57.8 ± 2.9 |
| PCL-urethane-PGDA | 2000 | Chloroform | 100 | 95.6 | 6.3 ± 0.3 |
| PEG-urethane-PGDA | 10000 | Water | 30# | 83.0 | 0.087 ± 0.002 |
| PEG-urethane-EPPETA | 10000 | Water | 30# | 94.5 | N/A |

*For determination of gel fractions,
Concentration in double distilled water

Characterization of the Thin Films Via Tensile Tests

Young's moduli of the crosslinked samples were evaluated using a tensile tester (Tinius Olsen) with a load cell of 500 N. Dog-bone shaped samples with a length of 30 mm were prepared from cross-linked films (thickness 1 mm). All measurements were performed at room temperature. A preload force of 1 N was applied and the specimens were deformed with a crosshead velocity of 10 mm/min. The Young's moduli were calculated from the slope of the linear part of the stress/strain curves (Table 1). PEG-based samples were swollen to equilibrium prior to tensile tests.

Determination of Degradation Rate of the Precursors Under Accelerated Degradation Conditions Crosslinked samples were incubated in 5M NaOH (37° C.) for 35 days. The samples were removed at certain time points, washed and vacuum dried. Degradation of the samples were evaluated gravimetrically, and weight loss were calculated via the equation;

$$\text{Weight Loss (\%)} = W_t/W_i \times 100\%$$

Where, $W_i$ and $W_t$ are weight of the samples initially and after degradation, respectively. Degradation rate of the samples was compared to that of commercial polycaprolactone (M.W.=10,000 g/mol, Sigma-Aldrich). Weight loss of the samples are plotted as a function of time and presented in FIG. 9.

PCL-urethane-EPPETA and the commercial PCL degraded at a comparable rate in the accelerated degradation medium. PCL-PGDA exhibited a slower degradation due to the hydrophobic nature of the propoxylated end-groups. Eventually, all polymers have completely degraded as indicated by 100% weight loss.

Example 3: Processing Multiacrylate-End Capped Precursors Via 2 Photon Polymerization 2-photon-polymerization is a method to generate structures with sub-micrometer resolution upon simultaneous absorption of two photons by the photosensitive material. The system includes a light source capable of generating femto-second pulses, which is typically Ti:sapphire laser (Titanium-sapphire lasers) oscillator emitting in the near-infrared region. Compared to one-photon absorption process, in two photon absorption, photoinitiators absorb two photons simultaneously for transition from a lower energy level to a higher energy level. The energy of two photons equals to the subtraction of the two energy levels. When the laser beam is closely focused into a volume of the photo-curable resin, the high photon density in the focal volume triggers the simultaneous absorption of two photons by initiator molecules, leading to the initiation of polymerization reaction in the extremely localized focal volume. By moving the laser focus through the photosensitive resin in 3 dimensions, any computer-designed 3D structure can be fabricated with precise control over the geometry. After fabrication of the microstructure, the sample is immersed in a suitable solvent to remove the unsolidified resin, leaving behind the printed microstructure on the substrate. 3D structures with feature sizes as small as 100 nm can be written via 2PP technology, and the resolution can be controlled by adjusting the laser power and the scanning speed. Examples for the applications of 2PP processing includes microfluidic devices, photonic crystals, patient-specific implants, tissue scaffolds, medical devices, filtration materials, microoptics and electronics.

Photoinitiator M2CMK is dissolved in tetrahydrofurane (THF) (stock solution concentration: 7 mM). Linear and star-shape PEG and/or PCL based precursors end-capped with multi- and single acrylates were dissolved in a certain volume of M2CMK stock solution. The molar ratio between M2CMK and the acrylate groups in the solution are kept at 0.02. The concentration of the acrylate groups in the precursor molecules are previously determined using $^1$H-NMR spectroscopy.

After complete dissolution of the PEG and PCL based precursors in THF, 20 µL of the prepared solution is placed onto a glass substrate. In order to enhance the sample adhesion, the glass substrates were immersed into a dilute solution of 3-(trimethyoxysilyl) propyl methacrylate before use. After placing the polymer solution droplet onto the substrate, the solvent was evaporated for 30 minutes at room temperature prior to 2PP processing. After evaporation of THF, the remaining polymer on the glass substrate was processed via a commercially available system (Photonic Professional, Nanoscribe GmbH) equipped with a near infrared laser light with a wavelength of 780 nm, pulse duration of 100 fs and repetition rate of 80 MHz. The precursors were processed using 63× microscope objective (numerical aperture: 1.4) with scanning speeds ranging from 10 mm/s to 90 mm/s whereas the average laser power in the process was in the range of 30-50 mW.

After the completion of the printing process, the sample was developed upon immersion into propylene glycol monomethyl ether acetate (PGMEA) for 30 minutes at room temperature to remove the non-crosslinked precursor. Morphologies of the scaffolds were observed via scanning electron microscopy (SEM).

Characterization of the Printed Microscaffolds Using Scanning Electron Microscopy With a scanning electron microscope, morphologies of the samples can be observed via scanning the sample at various depths with focused beam of electrons. Various types of signals are produced by the interaction between the beam and the specimen including secondary electrons (SE), back-scattered electrons (BSE) and characteristic X-rays. The samples can be imaged via this method with magnifications ranging between 10 up to 500,000 times. Scanning electron microscopy evaluation of the samples was performed using SEM (HIROX 4500M). The samples were sputter-coated (JFC-2300 from Jeol) with a layer of Au with thickness of 12 nm before SEM analysis.

Figure 4:
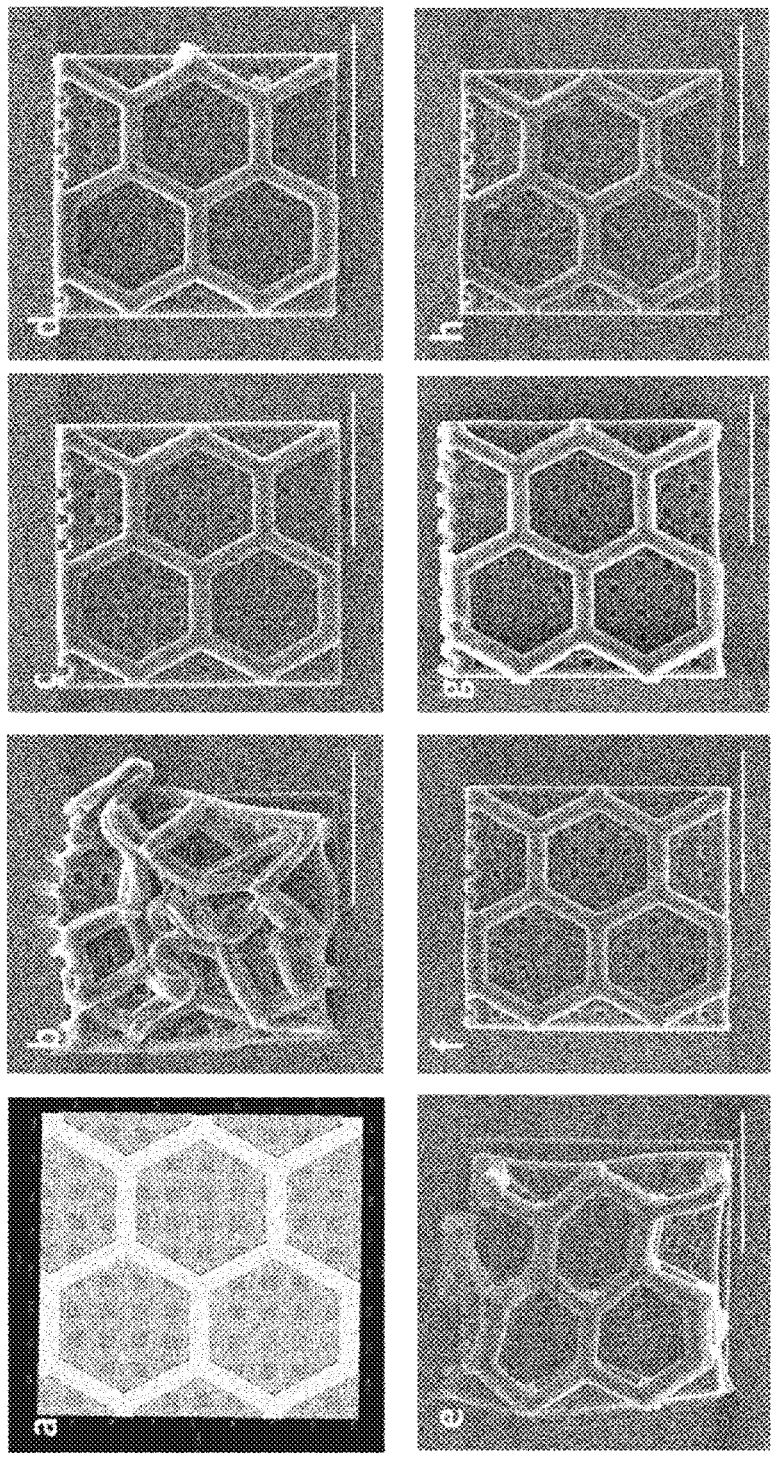
FIG. 4: Top row: (a) CAD model of the microscaffolds, SEM images of the microscaffolds printed from (b) 4-arm star-shape PCL end-capped with monoacrylated oligoethylene glycol on each arm and from PCL based urethanes end capped with (c) PGDA and (d) EPPETA.

In FIG. 4, SEM images of the microscaffolds printed via 2 photon polymerization method are presented. FIGS. 4 (c), (d), (f), (g), (h) are the microscaffolds printed from PCL-based urethane end-capped with propylene glycol diacrylate (PGDA), PCL-based urethane end-capped with ethoxylated and propoxylated pentaerythritol triacrylate (EPPETA), PEG-based urethane end-capped with pentaeryhtritol triacrylate (PETA), PEG-based urethane end-capped with ethoxylated and propoxylated pentaerythritol triacrylate (EPPETA) and PEG-based urethane end-capped with dipentaerythritol pentaacrylate (DPEPA), respectively. The microscaffolds written with the precursors mentioned above resulted in 3D micro-structures with better CAD-CAM mimicry and shape fidelity when compared to the microstructures printed from PEG-based urethane end-capped with single acrylate (FIG. 4e) and 4-arm star-shape PCL-based urethane end-capped with single acrylate on each end (FIG. 4b). The microscaffolds crosslinked from the precursors having single acrylates as end groups have distorted or completely collapsed after developing the scaffolds in the solvent.

Surprisingly, even though having equal number of acrylates per molecule and acrylate concentration per gram of the resin, PCL-based urethane end-capped with PGDA resulted in structures with excellent stability and shape fidelity, whereas 4-arm star-shape PCL-based urethane end-capped with monoacrylated oligoethyleneoxide on each arm resulted in collapsed structures after developing process. This proves that the precursors having multi-acrylates in close proximity in at least one end group of the molecule results in improved results in 2PP processing compared to those having single acrylate in each end group.

Interestingly, the morphologies of the scaffolds printed from the precursors end-capped with multiacrylates showed very wide processing window, showing no deformation with increasing speeds up to 90 mm/s. On the other hand, precursors end-capped with one acrylate on each end, showed significant deformation at all writing speeds ranging from 10 to 90 mm/s. FIG. 5 depicts the microscaffolds printed with PEG-based urethanes end-capped with PETA (top line), star-shape PCL based urethane end-capped with monoacrylated oligoethylene glycol on each arm (middle line) and PEG-based urethane end-capped with monoacrylated oligoethylene glycol (bottom line).

Example 4: Processing Multiacrylate-End Capped Precursors Via Stereolithography (SLA)

PEG based urethanes end-capped with multi- and di-acrylates were dissolved in MilliQ individually. Irgacure 2959 photoinitiator was added into the solutions. The molar ratio between Irgacure 2959 and the acrylate groups in the solution are kept at 0.02. The concentration of the acrylate groups in the precursor molecules are previously determined using $^1$H-NMR spectroscopy.

After complete dissolution of PEG-based urethanes end-capped with multi- and di-acrylates, the precursors were processed using SLA processor having 500 mW laser power. The precursors were processed using 2000 mm/s and 4000 mm/s laser scanning speeds to obtain thin layers. Number of scans were kept at 1. After the process, gel fractions of the cured polymers were determined.

Characterization of the SLA-Processed Precursors Via Gel Fraction Study

After SLA processing, the crosslinked polymers were taken out of the liquid precursors and punched out into disks (D=8 mm). The disks were freeze dried to remove the initial water content, weighed and incubated in MilliQ at room temperature for 3 days. Afterwards, the swollen samples were freeze dried and weighed again. The gel fractions of the materials were determined via the equation described in Example 2.

FIG. 6. Shows the gel fractions of the multi- and di-acrylate end-capped PEG-based urethanes processed with scanning speeds 2000 and 4000 mm/s. Gel fractions of multiacrylate end-capped PEG-based urethane processed with scanning speeds 2000 and 4000 mm/s were 96.06±1.12% and 96.37±0.14% whereas diacrylate end-capped PEG diacrylate processed with scanning speeds 2000 mm/s and 4000 mm/s were 67.04±1.11% and 53.27±1.93%, respectively.

Gel fractions of multi-acrylate end-capped PEG based urethane was high and close to 100% and not affected significantly by increasing the speed from 2000 to 4000 mm/s with 1× scan. Even though the gel fractions of diacrylate end-capped PEG-based urethanes increased via decreasing the scanning speed from 4000 mm/s to 2000 mm/s, the gel fractions were not sufficiently high. Gel fraction of 98.29±0.71% was achieved for diacrylate end-capped PEG-based urethanes only after scanning the precursors 3 times with 2000 mm/s scanning speed. These results can be explained with higher crosslinking efficiency of the multiacrylate end-capped PEG based urethanes.

Example 5: Synthesis of Tetraacrylate End-Capped PEG-Based Urethanes Via Modification of Diacrylate End-Capped PEG-Based Urethane Poly(ethylene glycol) (PEG, 2000 g/mol), Isophorone diisocyanate (IPDI), diethanolamine (DEA), *Candida antarctica* Lipase B (CaLB), 1-Thioglycerol and hexylamine (HA) was obtained from Merck. Bismuth neodecanoate was obtained from Umicore. Butylhydroxytoluene was obtained from Innochem GMBH. Bisomer PEA6 was supplied from GEO Specialty Chemicals. Tetraacrylate end-capped PEG-based urethanes were prepared according to the reaction schemes depicted in FIG. 7, and as further defined herein below.

In a first step, diacrylate end-capped PEG-based urethanes were prepared by adding 500 g PEG (2000 g/mol), 0.39 g butyl hydroxytoluene (BHT) and 0.09 g phosphoric acid ($H_3PO_4$, 85%) to a double jacketed reactor vessel connected to an oil bath and equipped with a stirrer. The mixture was heated under a $N_2$ blanket to dry the PEG, followed by the addition of 111 g isophorone diisocyanate (IPDI) and 0.23 g bismuth neodecanoate catalyst. The temperature was held at 75° C. After two hours, 168 g Bisomer PEA6 and 0.23 g bismuth neodecanoate were added to the reactor under an air flux. The temperature was maintained at 80° C. until the isocyanate content was lower than 0.02 meq $g^{-1}$, after which the reaction was terminated.

In the next steps, the obtained product was modified using 2 different methods in order to obtain tetraacrylate end-capped PEG-based urethanes, as described below.

a) Modification of Diacrylate End-Capped PEG-Based Urethane Via Aza-Michael Addition of Diethanolamine and Acrylation In this method, the synthesis of diacrylate end-capped PEG-based urethane was followed by the Michael addition reaction between diethanolamine (DEA) and the acrylates, which was catalyzed by *Candida Antarctica* Lipase B (CaLB) to obtain tetrol end-capped PEG-based urethane. In a second step, the tetrol end-capped PEG-based urethane was reacted with acryloyl chloride to obtain tetraacrylate end-capped PEG-based urethane.

20 g diacrylate end-capped PEG-based urethane and 1.59 mL DEA was dissolved in ethanol followed by the addition of 0.226 g CaLB. The reaction mixture was stirred via magnetic stirrer at 50° C. for 8 h to obtain tetrol end-capped PEG-based urethane and the product was purified via dialysis for 24 h. In a second step, 15 g of tetrol end-capped PEG-based urethane was dissolved in 60 mL dry dichloromethane (DCM) in a 3-neck flask. The flask was cooled in an ice bath and 4.32 mL acryloyl chloride was added to the solution dropwise under continuous Ar flow. After 2 h, the ice bath was removed, and reaction mixture was stirred at room temperature for 5 h. The tetraacrylate end-capped PEG-based urethane product was obtained by precipitating the solution in cold diethyl ether, filtering and drying in vacuum oven overnight.

b) Modification of Diacrylate End-Capped PEG-Based Urethane Via Thio-Michael Addition Click Reaction and Acrylation In this method, the synthesis of the diacrylate end-capped PEG-based urethane was followed by the thio-Michael addition reaction between 1-Thioglycerol and the acrylates, which was catalyzed by hexylamine (HA) to obtain tetrol-end-capped PEG-based urethane. In a second step, the tetrol end-capped PEG-based urethane was reacted with acryloyl chloride to obtain tetraacrylate end-capped PEG-based urethane.

20 g diacrylate end-capped PEG-based urethane and 2.38 mL 1-Thioglycerol was dissolved in ethanol followed by the addition of 3.61 mL HA. The reaction mixture was stirred via magnetic stirrer at 40° C. for 4 h to obtain tetrol end-capped PEG-based urethane and the product was purified via dialysis for 24 h and dried in vacuum oven. In a second step, 15 g of tetrol end-capped PEG-based urethane was dissolved in 60 mL dry DCM in a 3-neck flask. The flask was cooled in an ice bath and 7.19 mL acryloyl chloride was added to the solution dropwise under continuous Ar flow. After 2 h, the ice bath was removed, and reaction mixture was stirred at room temperature for 5 h. The tetraacrylate end-capped PEG-based urethane product was obtained by precipitating the solution in cold diethyl ether, filtering and drying in vacuum oven overnight.

Characterization of Tetraacrylate End-Capped PEG-Based Urethanes Via $^1$H-NMR Spectroscopy The $^1$H-NMR spectrum of the precursor was obtained as described in Example 1.

Figure 8:
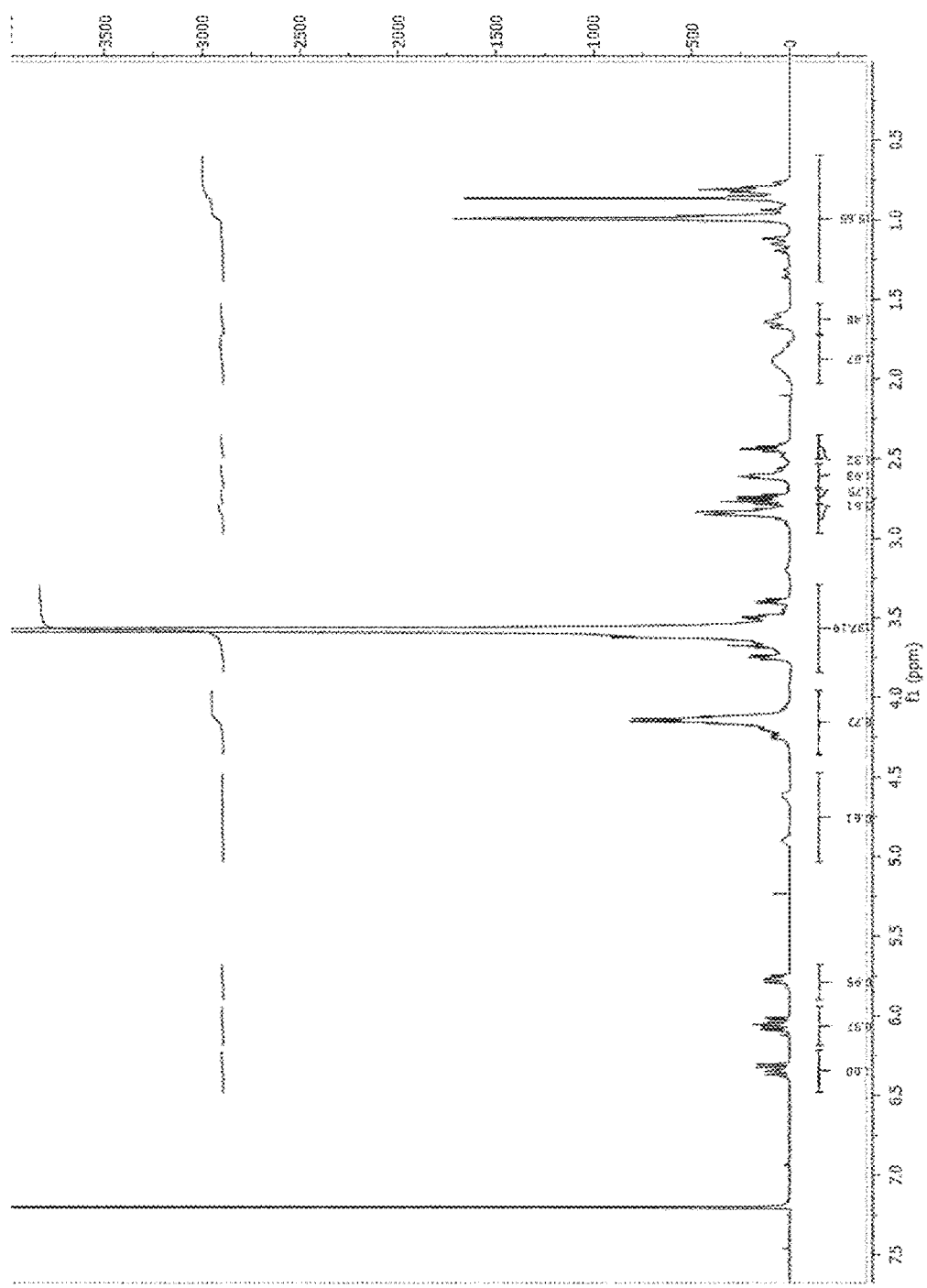

The $^1$H-NMR spectrum of tetraacrylate end-capped PEG-based urethane (synthesized via aza-Michael addition of DEA and acrylation method) is shown in FIG. 8. The signals at 5.8, 6.1 and 6.3 belong to acrylate protons. The signal attributed to methylene protons present in the PEG backbone can be observed from 3.3 to 3.8 ppm. The signal between 0.7 and 1.3 ppm correspond to the protons in the cyclic methylene units of IPDI. The signals of the protons of methylene groups in the α-position to the aminoester function appears at 2.81 ppm, while signal at 2.36 corresponds to the protons of the methylene group in the 3-position.

Example 6: Evaluation of the Network Formation Via Photo-Rheology

Storage moduli (G') of the precursors were determined via rheology study during simultaneous UV irradiation. An Anton Paar Physica MCR 300 rheometer was used equipped with an EXFO Novacure 2000 UVA light for sample irradiation from the bottom through a quartz plate. The precursors were initially molten at 60° C. for sample loading and subsequently cooled down to 20° C. prior to the experiment. The experiment was carried out at a constant temperature of 20° C. using a parallel-plate setup with a top diameter of 15 mm.

Initially, the moduli of the precursors were recorded for 10 min prior to UV irradiation. Next, the samples were irradiated for 30 min followed by a 5 min interval without UV exposure to determine the final moduli. The storage moduli of the PEG-urethane-PETA, PEG-urethane-EPPETA, PCL-urethane-EPPETA and PCL-urethane-PGDA during UV irradiation can be seen in FIG. 10. The precursors exhibited fast crosslinking reaction upon UV irradiation in absence of a solvent at 20° C.

Example 7: Electrospinning of Acrylate End-Capped Urethane-Based Polymers

For electrospinning the PEG-urethane-PGDA (backbone molecular weight: 10,000 g/mol), the precursor was dissolved in water/ethanol (90/10) at a concentration of 10%. In order to facilitate the fiber formation, 1% polyethylene (glycol) (1,000,000 g/mol, Sigma-Aldrich) was added into the electrospinning solution. The solution was electrospun at a voltage of 15 kV, syringe pump flow rate of 0.5 mL/h and smooth, beadless fibers were obtained (data not shown)

REFERENCES

Claeyssens et al., Three-Dimensional Biodegradable Structures Fabricated by Two-Photon Polymerization, Langmuir 25 (2009), 3219-3223.

Weiß et al., Two-Photon Polymerization of Biocompatible Photopolymers for Microstructured 3D Biointerfaces, Advanced Engineering Materials 13 (2011), B264-B273.

Berg et al., Synthesis of Photopolymerizable Hydrophilic Macromers and Evaluation of Their Applicability as Reactive Resin Components for the Fabrication of Three-Dimensionally Structured Hydrogel Matrices by 2-Photon-Polymerization, Advanced Engineering Materials 13 (2011) B274-B284.

Melissinaki et al., Direct laser writing of 3D scaffolds for neural tissue engineering applications, Biofabrication 3 (2011) 045005 (12pp).

Felfel et al., In vitro degradation and mechanical properties of PLA-PCL copolymer unit cell scaffolds generated by two-photon polymerization 2016 Biomed. Mater. 11015011.

The invention claimed is:

1. An acrylate end-capped urethane- or urea-based polymer according to formula (I):

$$X_1-Y_1-Z_1\text{-backbone-}Z_2-Y_2-X_2 \quad (I)$$

where:
$X_1$ and $X_2$ independently represent a moiety comprising one or more (meth)acrylate groups;
$Y_1$ and $Y_2$ are independently a spacer selected from polyethylene glycol, polypropylene glycol, or combinations thereof;
$Z_1$ and $Z_2$ independently represent a urethane- and/or urea-containing moiety; and
backbone represents a polymer,
wherein
the sum of acrylate groups in $X_1$ and $X_2$ is at least 3.

2. The acrylate end-capped urethane- or urea-based polymer of claim 1, wherein the molecular weight of the acrylate end-capped urethane- or urea-based polymer is at least 4000 Da.

3. The acrylate end-capped urethane- or urea-based polymer of claim 1, wherein the sum of acrylate groups in $X_1$ and $X_2$ is 3 or 4.

4. The acrylate end-capped urethane- or urea-based polymer of claim 1, wherein:
the sum of acrylate groups in $X_1$ and $X_2$ is 3 or 4; and
the molecular weight of the acrylate end-capped urethane- or urea-based polymer is at least 4000 Da.

5. The acrylate end-capped urethane- or urea-based polymer of claim 1, wherein the backbone is selected from polyethers, polyamides, polysaccharides, polyoxazolines, and polyesters.

6. The acrylate end-capped urethane- or urea-based polymer of claim 1, wherein the backbone is selected from polyethylene glycol (PEG), polypropylene glycol (PPG), poly N-vinyl pyrrolidone (PVP), poly N-vinyl caprolactam (PVNCL), polycaprolactone (PCL), polylactic acid (PLA), and polyglycolic acid (PGA).

7. The acrylate end-capped urethane- or urea-based polymer of claim 1, wherein $X_1$ and $X_2$ are independently selected from ethoxylated and/or propoxylated pentaerythritol tri(meth)acrylate (EPPETA), propoxylated glycerol di(meth)acrylate (PGDA), and combinations thereof.

8. The acrylate end-capped urethane- or urea-based polymer of claim 1, wherein $Z_1$ and $Z_2$ are independently polyisocyanate moieties.

9. The acrylate end-capped urethane- or urea-based polymer of claim 8, wherein the polyisocyanate moieties are selected from diisocyanate moieties and trimers of polyisocyanates.

10. The acrylate end-capped urethane- or urea-based polymer of claim 9, wherein the diisocyanate moieties are selected from cycloaliphatic diisocyanates, aliphatic diisocyanates, and aromatic diisocyanates.

11. The acrylate end-capped urethane- or urea-based polymer of claim 9, wherein the diisocyanate moieties are selected from the group consisting of
5-isocyanato-1-isocyanatomethyl-1,3,3-trimethylcyclohexane (IPDI),
1,1'-methylene bis[4-isocyanatocyclohexane] (H12MDI),
L-2,6-Diisocyanatohexanoic acid ethyl ester (LDI),
1,6-diisocyanatohexane (HDI),
1,6-diisocyanatohexane biuret,
1,6-diisocyanatohexane isocyanurate,
1,6-diisocyanato-2,4,4-trimethylhexane (TMDI),
2,4-diisocyanatotoluene (TDI),
1,4-diisocyanatobenzene (BDI), 1,3-meta-tetramethylxylylene diisocyanate (TMXDI), and 1,1'-methylenebis(4-isocyanatobenzene) (MDI); and derivatives thereof.

12. The acrylate end-capped urethane- or urea-based polymer of claim 9, wherein the trimer of polyisocyanates is a trimer of 5-isocyanato-1-isocyanatomethyl-1,3,3-trimethylcyclohexane (isophorone diisocyanate, IPDI).

13. The acrylate end-capped urethane- or urea-based polymer of claim 1, wherein $Z_1$ and $Z_2$ are independently selected from the group consisting of
   5-isocyanato-1-isocyanatomethyl-1,3,3-trimethylcyclohexane (IPDI),
   1,1'-methylene bis[4-isocyanatocyclohexane] (H12MDI),
   L-2,6-diisocyanatohexanoic acid ethyl ester (LDI),
   1,6-diisocyanatohexane (HDI),
   1,6-diisocyanatohexane biuret,
   1,6-diisocyanatohexane isocyanurate,
   1,6-diisocyanato-2,4,4-trimethylhexane (TMDI),
   2,4-diisocyanatotoluene (TDI),
   1,4-diisocyanatobenzene (BDI),
   1,3-meta-tetramethylxylylene diisocyanate (TMXDI),
   1,1'-methylenebis(4-isocyanatobenzene) (MDI), and
   a trimer of 5-isocyanato-1-isocyanatomethyl-1,3,3-trimethylcyclohexane (isophorone diisocyanate, IPDI).

14. The acrylate end-capped urethane- or urea-based polymer of claim 13, wherein:
   the backbone is selected from polyethylene glycol (PEG), polypropylene glycol (PPG), poly N-vinyl pyrrolidone (PVP), poly N-vinyl caprolactam (PVNCL), polycaprolactone (PCL), polylactic acid (PLA), and polyglycolic acid (PGA); and
   $X_1$ and $X_2$ are independently selected from ethoxylated and/or propoxylated pentaerythritol tri(meth)acrylate (EPPETA), propoxylated glycerol di(meth)acrylate (PGDA), and combinations thereof.

15. A method, comprising:
   processing an acrylate end-capped urethane- or urea-based polymer according to claim 1 in a method selected from the group consisting of 2-photon polymerization, stereolithography (SLA printing), electrospinning, film casting, porogen leaching, extrusion based 3D-printing, spray drying, cryogenic treatment, coatings, cross-linkable micelles, spin coating, and electrospraying.

* * * * *

UNITED STATES PATENT AND TRADEMARK OFFICE
CERTIFICATE OF CORRECTION

| | | |
|---|---|---|
| PATENT NO. | : 12,091,490 B2 | Page 1 of 1 |
| APPLICATION NO. | : 17/291049 | |
| DATED | : September 17, 2024 | |
| INVENTOR(S) | : Aysu Arslan et al. | |

It is certified that error appears in the above-identified patent and that said Letters Patent is hereby corrected as shown below:

In the Specification

In Column 13, Line(s) 23 & 24, delete "technique, is available;" and insert --technique are available:--, therefor.

In Column 14, Line(s) 11, delete "destabilize" and insert --is destabilized--, therefor.

In Column 15, Line(s) 42, after "amide", delete "11" and insert --III--, therefor.

In Column 15, Line(s) 53, delete "corresponds" and insert --correspond--, therefor.

In Column 15, Line(s) 57, delete "correspond" and insert --corresponds--, therefor.

In Column 16, Line(s) 4, delete "Vallee" and insert --Vallée--, therefor.

In Column 17, Line(s) 35, delete "includes" and insert --include--, therefor.

In Column 21, Line(s) 3, delete "correspond" and insert --corresponds--, therefor.

In Column 21, Line(s) 5, delete "appears" and insert --appear--, therefor.

In Column 21, Line(s) 7, delete "3-position" and insert --β-position--, therefor.

In Column 21, Line(s) 15, after "was", delete "used".

Signed and Sealed this
Fourth Day of March, 2025

Coke Morgan Stewart
*Acting Director of the United States Patent and Trademark Office*